the frequency acquisition circuitry are resistors R3 and R5, and capacitor C2. Resistor R5 determines the damping factor, and resistor R3 determines the bandwidth of the phase lock mode. The phase lock loop parameters for all three phase lock loops appear in the following Table. All relationships are based on a damping factor of 0.707.

opens. The autocorrelation of waveform $P_{1/4}$ is a convenient function for detecting this condition. This function is shown in FIG. 3 at (*c*). This is the average voltage as a function of phase angle and is available from multiplier 30 at point A in FIG. 1. This signal is passed through a low pass filter (LPF) 35 to a threshold detector 37. The phase angle ±T/2 corresponds to one half TABLE OF PHASE LOCK LOOP PARAMETERS
(Damping factor = 0.707 for all phase lock loops)

| Phase lock loop | | $K_0$ (VCO gain constant), (rad/sec)/V | $K_d$ (phase detector gain constant), V/rad | $\omega_n$ (undamped natural frequency), rad/sec | $B_L$ (phase lock noise bandwidth), Hz | Damping resistance, kΩ |
|---|---|---|---|---|---|---|
| Freq. acq. phase lock loop | Functional representation | | $\frac{E}{\pi}$ | $\sqrt{\frac{K_0K_d}{R3C2}}$ | $\frac{\omega_n}{2}$ | $\frac{\sqrt{2}}{\omega_n C2}$ |
| | Numerical value | 298 | 1.59 | 125 | 62 | 11 |
| Coarse phase lock loop | Functional representation | $\frac{\pi}{2^5 R_E E_4 C}$ | $\frac{2KA}{\pi}$ | $\sqrt{\frac{K_0K_d}{R4C2}}$ | $\frac{\omega_n}{2}$ | $\frac{\sqrt{2}}{\omega_n C2}$ |
| | Numerical value | 298 | 0.159 | 33 | 16.5 | 43 |
| Fine phase lock loop | Functional representation | $\frac{\pi}{2R_E E4C}$ | $\frac{16KA}{\pi^3}$ | $\sqrt{\frac{K_0K_d}{R1C2}}$ | $\frac{\omega_n}{2}$ | $\frac{\sqrt{2}}{\omega C2}$ |
| | Numerical value | 9480 | 0.128 | 33 | 16.5 | 43 |

Switch SW4 is closed during the initial phase lock mode and is also supplying a phase error signal (see (*a*), FIG. 3) to error amplifier 10 of the active loop filter. This phase error signal results from the cross-correlation between waveforms $P_{1/4}$ and $P_{1/4}$ (−90°) and is shown at (*b*) in FIG. 3. The active loop filter components associated with the coarse phase lock loop are resistor R4, resistors R2 + R5, and capacitor C2. Resistor R4 determines the coarse phase lock loop bandwith, and resistors R2 + R5 determine the damping factor. Frequency phase lock loop components include flip-flop 18, resistors R3 and R5, capacitor C2, VCO 12, and waveform generator 20. Terminal 21 of waveform generator 20 is connected to terminal 25 which is connected to flip-flop 18. The frequency acquisition phase lock loop provides the dominant control during the initial phase lock mode. This is shown by the fact that although resistors R3 and R4 are comparable, the phase detector gain constant $K_d$ for the frequency acquisition phase lock loop is ten times that for the coarse phase lock loop (see the above Table).

The phase resolution accuracy of the frequency acquisition phase lock need not be great. As noted, the requirement of the initial phase lock mode is to reduce the phase error to less than ±T/2. For this reason, the phase shift through BPF 14 is not critical. The phase shift through BPF 14 will be zero when the clock is at the nominal design value. The system is designed to handle clock frequency variations of ±10 percent of the nominal value. Therefore, the phase shift through the BPF must be less than ±T/2 for these extremes of clock frequency. The actual phase shift at ±10 percent off frequency is about ±T/4.

When the phase angle between the multiplexer and the demultiplexer is reduced below ±T/2, switch SW3 of the correlation peak KA, and the threshold level is set at a level corresponding to 0.6 KA. After final phase lock is achieved, the average voltage at point A will be KA. The bandwidth of LPF 35 must be narrow enough to reduce the rms noise voltage, under worst noise conditions, to a level such that the probability of noise peaks exceeding 0.4 KA is negligible. Peaks exceeding 0.4 KA would cause false closure of switch SW3.

Multipliers 30, 31, 32 and 33 are phase demodulator type circuits from which a dc voltage is derived. Preferably FET switches are used for the multipliers. Multiplier 30 functions both as a difference frequency detector and a signal phase detector whereas multipliers 31, 32 and 33 merely operate as phase detectors.

The output waveforms $P_{1/4}$, $P_{15}$, $P_{1/4}$(−90°) and $P_{12}$ from demultiplexer waveform generator 20 are connected to multipliers 30, 31, 32 and 33 respectively (i.e., terminals 21, 22, 23 and 24 are connected to terminals 25, 26, 27 and 28, respectively). Other subcarrier waveforms associated with the telemetry data, which are used to demodulate the data, are also obtained from demultiplexer waveform generator 20.

COARSE PHASE LOCK MODE

The coarse phase lock mode is defined as the period of operation between the opening of switch SW3 and the opening of switch SW4. During this time, both the coarse phase lock loop and the fine phase lock loop are supplying phase error currents to the error amplifier 10.

The dominant error signal is provided by the coarse phase lock loop. The loop filter components associated with the fine phase lock drop are resistor R1, resistors R2 + R5, and capacitor C2. The damping resistance for both the coarse and fine phase lock loops is provided

CIRCUIT ARRANGEMENT FOR CENTRALLY CONTROLLED TELEPHONE EXCHANGE INSTALLATIONS HAVING COMMON MEMORY FACILITIES

BACKGROUND OF THE INVENTION

The invention relates to a circuit arrangement for centrally controlled telephone exchange installations, especially telephone exchange installations in which individual devices are combined in groups and are in connection with a central control unit over individual group buffer memory-and/or code transformation devices.

The telephone exchange installation with central control described in U.S. Pat. No. 3,665,110, shows a plurality of groups of individual apparatus designated as operational areas with code transformation-and buffer memory devices designated as operating area control units associated with the group. The term individual apparatus is defined herein to include, inter alia, dial receiving units, connection units, line repeaters, and adjustment devices for separate switching matrix parts. The operating area control units facilitate the exhange of information between an individual apparatus and the central control unit for the accommodation of the information transmission speeds of the individual apparatus and the central control unit to each other. Because of the division into operating areas it is possible to spatially separate sub-offices, which are provided in remote subscriber relay senders, and thereby to achieve the advantage of the short-est possible subscriber lines. This may be done without having to sacrifice the technical integrity of the entirety of the operating areas served by a common central control unit.

Circuit arrangements for telephone exchange installations with central control devices, which are connected to each other from exchange installation to exchange installation, over central data channels arranged in line bundles, are known from British Pat. publications Nos. 843,175 and 1,205,306 and German Pat. No. 1,097,491. The exchange of information over a data channel directly between the central control devices of two exchange installations connected with each other over telephone connection lines substantially simplifies and accelerates, as is well known, the formation of connections. If dial identifying signals must be transmitted from one central control to the next, then in the application of conventional technology, these are passed through from central control to central control over a forwarding register, outgoing line repeater, transmission line, incoming line repeater, and receiving register. This requires a multiple transformation of the information to take place. This requires greater expenditure of time (thus, slower production of connections) and greater hardware expenses (more expensive registers and line repeaters), and brings with it the danger of a signal transformation error. In contrast, the circuit arrangements known from the cited patent literature proceed from the principle of accomplishing the transmission of dial identifying signals over a direct path bypassing the connection line and its line repeaters. An optimal solution in this respect is to connect the central control devices with each other over central data channels, which transmit dial identifying signals, leading from exchange installation to exchange installation and arranged with the corresponding line bundles. The arrangement of central data channels in this manner makes it possible to obviate the need for line repeaters of this type.

U.S. Pat. No. 3,665,110 mentioned in the introduction describes the application of the aforementioned data channels for the exchange of information between operating area control units of operating areas spatially remotely located in the above described manner, and remotely located from the central control unit. The herein described principle of control of an operating area, which also can be understood as a type of suboffice, by (through) a central control unit in addition also produces the above mentioned possibility having to do with the connection lines leading from, for example, an operating area at a location of the central control unit to a spatially remotely located operating area. That is, the need for line closing circuits between each of the two ends of a given connection line and the two pertinent switching matrix connectors is obviated, because the dialing signals for the production of a connection are transmitted over the data channel. In this case, the data channel serves not only for the remote control of the sub-office from the central control unit, but also for the omission of the line closing circuits.

If it is desired to allow different telephone exchange installations of this type, which each have at their disposal an individual central control unit, to enter into connection with each other over data channels, then a data channel in accordance with U.S. Pat. No. 3,665,110 must proceed from a central control unit, and, instead of leading to an operating area control unit, it must rather be routed to a central control unit of another remote telephone exchange installations. The information density would, indeed, be approximately the same, as in the previous case, for the increased information flow only for the purpose of exchange of dialing signals between central control unit and central control unit (in comparison with those between central control unit and operating area control unit, i.e., between telephone exchange installations and a connected sub-office) is out-weighed by the ommission of the information flow only for the purpose of switching connection paths through the switching matrix according to U.S. Pat. No. 3,665,110 (path seeking, switching matrix setting and return).

There are, however, also cases in which a still more intensive exchange of information over data channels is to be expected. This can be the case, when an especially great connection traffic prevails between two telephone exchange installations, each having an individual central control unit, for example, between two neighboring densely populated cities. This case is also then to be expected when in one large city, one centrally controlled local office having a central control unit serving the entire local traffic of the large city and a regional central long distance office also having an individual central control unit are provided, and when this central long distance office, in addition to the regional through-traffic develops the total outgoing and incoming long distance traffic of the large city.

There exists, therefore, the problem of how to make possible a still greater equalization of loads of central control units.

SUMMARY OF THE INVENTION

This problem is solved through a combination of the following features:

a. A common device mediating between the central control unit and the buffer memory-and/or code transformation device, for example, operating area control units, is provided, and it directs its own connection individually and successively to the buffer memory-and/or code transformation devices. This common device receives information from the buffer memory-and/or code transformation devices and stores it next to their addresses in order to transmit them together with their addresses and in multiples to the central control unit. The common device receives, from the central control unit, information together with addresses and grouped in multiples, in order to individually distribute information after its own connection to the buffer memory-and/or code transformation device.

b. Parallel to the common devices described under (a), data transmission apparatus of data channels leading to other central control units are connected with the central control unit.

c. The central control unit directs the connection of data transmission apparatus that is to say, of the common devices described under (a).

The invention creates the advantage that the central control unit no longer needs to direct, as previously, a connection or disconnection of an operating area control unit between each receipt of information or each sending out of information. This is especially true in view of the fact that this connection is completed according to the scanner principle, because in this case, in known installations, a number of connection operations and disconnection operations must be directed between each receipt of information or each sending out of information. The exchange of information is thereby substantially accellerated for a central control unit, and its capacity is thereby substantially increased in that the different pieces of information can be picked up and given off by the central control unit together in multiples. Through this type of informatin reception and transmission on the part of the central control unit, further, more favorable operating conditions are created for data traffic or other central control units, in that through the transmission of pieces of information collected in multiples, the information density can be substantially increased on the data channels serving these purposes. The device described under (a) and data channels having comparable information density have the same type of access to the central control unit and develop their data traffic with the central control unit according to the same principle of information collection transmission.

DETAILED DESCRIPTION OF THE DRAWINGS

Figure 1A:
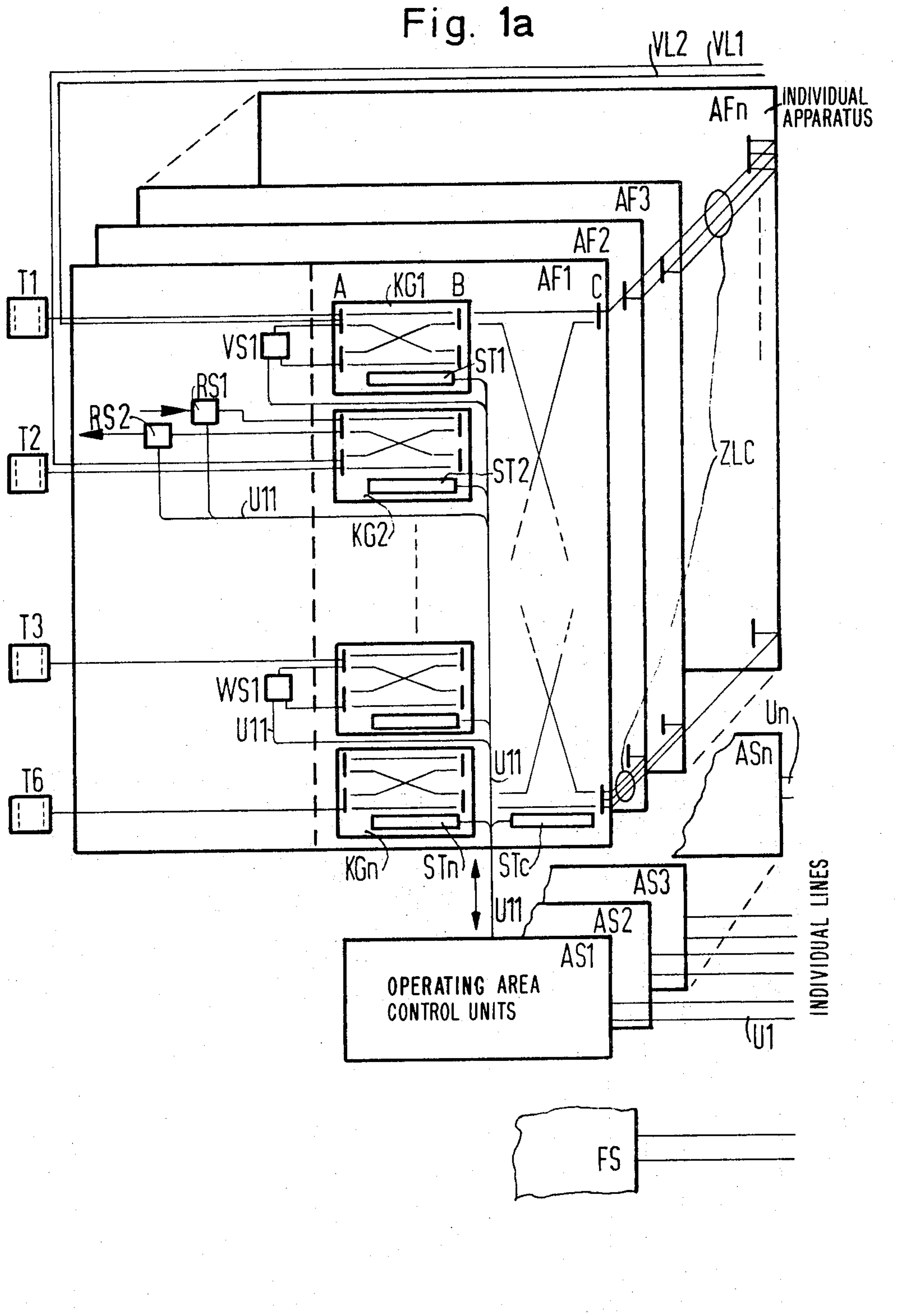
FIG. 1, constituted of FIGS. 1a and 1b, shows an over-view for a telephone exchange installation, to which the invention is applied.

Certain portions of the illustrated embodiment are not described herein in detail because their construction and operation are known in the art. Such elements, of course, do not constitute the inventive features, and it is to be construed that the known forms of such elements are contemplated. Those portions of the illustrated embodiment are described in detail only as necessary for an understanding of the invention.

In FIG. 1 several groups, AF1 through AFn, etc., of individual apparatus are indicated. The identity of the elements constituting individual apparatus was discussed hereinabove, and hereinbelow. These groups are hereafter designated as operating areas. The operating areas AF1 through AFn are component parts of a larger exchange installation. With each of the operating areas, an intermediate memory and code transformation device (buffer memory) AS1 through ASn, hereafter designated as operating area control units, is, respectively, individually associated. The operating area control units AS1 through ASn of the exchange installation are individually in connection over two individual lines U1 through Un each and to common information collection transmission memories SS1 and SS2, which serve for information collection and transmission and which, hereafter, are designated as collection memories. The system has two central control units, or data processing units which control the operations of the system, ZS1 and ZS2. The arrangement of two collection memories and central control units each next to two individual lines U1 through Un each serves in a known manner to increase the operational reliability of the entire exchange installation with reference to the possibility of malfunction or interruption of operation of a central control unit, as well as the monitoring for errors through the comparison of two pieces of information processed independently of each other by tow different central control units. Because this is not essential for the understanding of the invention, hereafter principally, only one single central control unit ZS1, one single collection memory SS1 and, in any given case, one single individual line, for example, U1, U2, etc., will be discussed. Data transmission apparatus, for example, D1 and others which are not represented, are also connected to the collection memory SS1 over an individual line, for example, Ud. These data transmission apparatus, hereafter designated as data apparatus, form in conjunction with a second, individually associated data apparatus, for example, D1', and a data line, for example, ***d*1, data channels, which make it possible for individual remote operating areas, for example, AFF, to exchange information with the central control unit ZS1**. It is also possible, to provide a common data channel for several operating areas located at one and the same remote location.

The operating areas each consist of a working plurality of different individual apparatus. These include, among othe things, in the switching stages A and B of the three stage switching matrix the coupling groups, for example, KG1 through KGn, KGf1, KGf2, etc., put together from individual coordinate switching matrices. Each switching group, for example, KG1, is associated with an individual engagement device, for example, ST1, which carries out engagement commands received from the operating area control unit. In any given case, one coupling group with associated engagement device forms an individual apparatus. Further, the totality of the switching matrices of the switching stage C with its engagement device STc are individual apparatus. It is also possible to combine the switching matrices in one operating area in several individual apparatus with individual engagement devices. Further, connecting units, for example, ZS1, for connections which are to be switched through or completed within the exchange installation formed from the operating areas AF1 through AFn, further line units (line sets), for example, RS1, Rs2, and further, which are individually associated with connection lines (local or long distance lines) to exchange installations at other locations for incoming and/or outgoing connections, are individual apparatus. Individual apparatus are also constituted by dial receivers, for example, WS1 and others, to which subscribers are temporarily connected for the duration of the reception of the dialing information given off by them.

In addition, individual subscriber connection circuits (not shown) can be arranged as individual apparatus singly or collected in groups. Further, the possibility is shown of combining the named individual apparatus into operating areas each having an individual operating area control unit. Thus it is conceivable, for example, to form groups of individual apparatus, which, in any given case, only include apparatus of one single type each, and then to assign each of these groups to an individual operating area.

All of the individual apparatus of an operating area, for example, AF1, are connected with the appropriate operating area control unit, for example, AS1, over current circuits for example, U11, which are common to the apparatus. Each individual apparatus contains connecting means for connecting to those current circuits which can be controlled from the operating area control unit. When a connection demand is present in an individual apparatus, a connection signal is given off by this individual apparatus to the operating area control unit in a manner described further below in detail. The latter signal is in the operating area control unit identified, and it causes the transmission of a connection command to the affected individual apparatus. Each operating area control unit, for example, AS1, is also connected with the individual apparatus of its group, also its operating area, over those common current circuits, for example, U11, to which the individual apparatus can be individually connected. The individual apparatus of an operating area, for example, AF1, are so limited in their number and are so united in construction with their operating area control unit (buffer memory) (compare FIG. 4), that with the disconnection of line influences, the switching elements of the individual apparatus and of the operating area control unit directly exchange signals.

The switching multiplies of a plurality of operating areas at one place form a single common switching matrix, which solely for reasons which are not causally related to the grouping of the switching matrix (for example, reliability, possibilities of extinction and questions of traffic loading), is subdivided into a plurality of competence regions of a number of operating area control units. The switching matrix formed from the switching multiples in the switching stages A, B and C of the operating areas AF1 through AF11 is constructed of switching multiplies in three switching stages connected with each other over intermediate lines. At the inputs of the first switching stage (FIG. 1*a;* A), subscriber lines, connection lines and all inputs and outputs of switching members required per connection for the production and supervision of connections, for example, connecting units VS1, VS2, dial receivers WS1, WS2, and the like, switched on in the same manner. The outputs of the switching multiples of the first through next to last switching stages, which are individually connected to the inputs of the switching multiples of the next successive switching stage, can be switched together pair-wise in this next successive coupling stage.

German Pat. DBP No. 1,235,379 shows and describes a switching matrix of this type. The special characteristic of such a switching matrix is that from one switching matrix input, the outputs of each of the switching multiples can be reached over at most one single connection path. By this means, in seeking of a path from one switching matrix input, through the selection of one of these outputs, the path to be put through over the switching matrix for the desired connection is already determined. The switching matrix, seen from its inputs to the outputs of its couplers, is constructed in a fan-like configuration. In spite of this, however, two switching matrix inputs can alternately be connected with each other over different paths, because from the two switching matrix inputs, more and more common switching multiple outputs are accessible. That is, more than once each two switching multiple outputs belonging in different operating areas of the last switching stage, and fixedly connected over an intermediate line, ZLC, to the last switching stage are accessible.

The operating areas, for example, AF1, thus, each have three switching stages having switching multiples are connected over intermediate lines in such a manner that a switching multiple input in the second through last switching stage B and C is individually fixedly associated with a switching multiple output in the first through next to last switching stages A and B. The outputs of the switching multiples of the switching stage C are unwired in the operating areas AF1 through AF*n* in part and in the operating area AFF, entirely. In the operating areas AF1 through AF*n*, a substantial portion of these outputs are connected in pairs over intermediate line ZLC leading from operating area to operating area.

The two central control units ZS1 and ZS2 arranged next to each other, are each assigned a program memory PS1 and PS2. From the program memory, the central control unit learns by which program a piece of information, transmitted by an operating area control unit, over the associated collection memory SS1 and taken up in the central control unit, is to be processed.

In addition, the two central control units are assigned a common multiple-part information memory ZJS, the entire storage capacity of which is thus, available to both central control units according to their requirements at any given time.

Figure 1B:
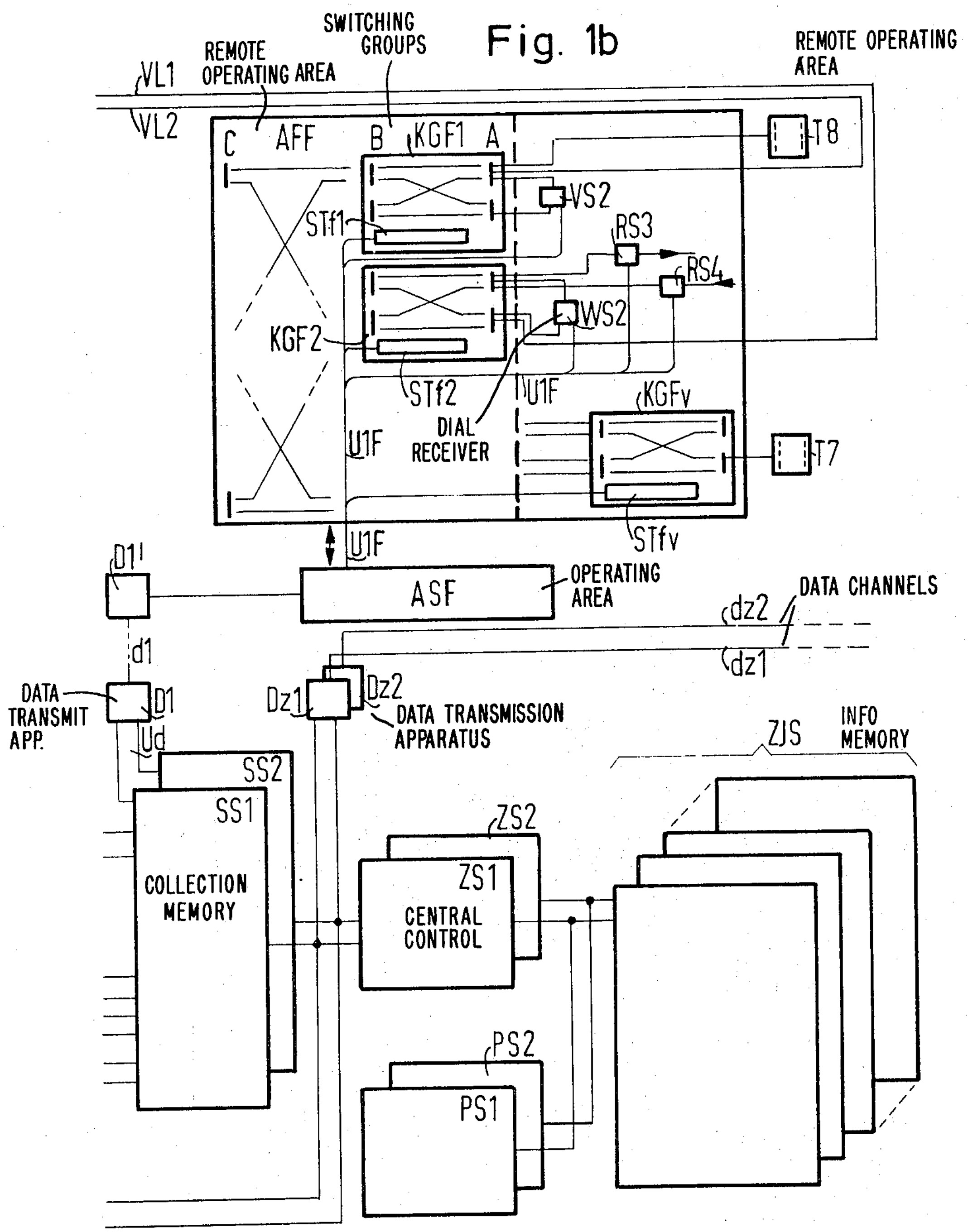
Figure 2:
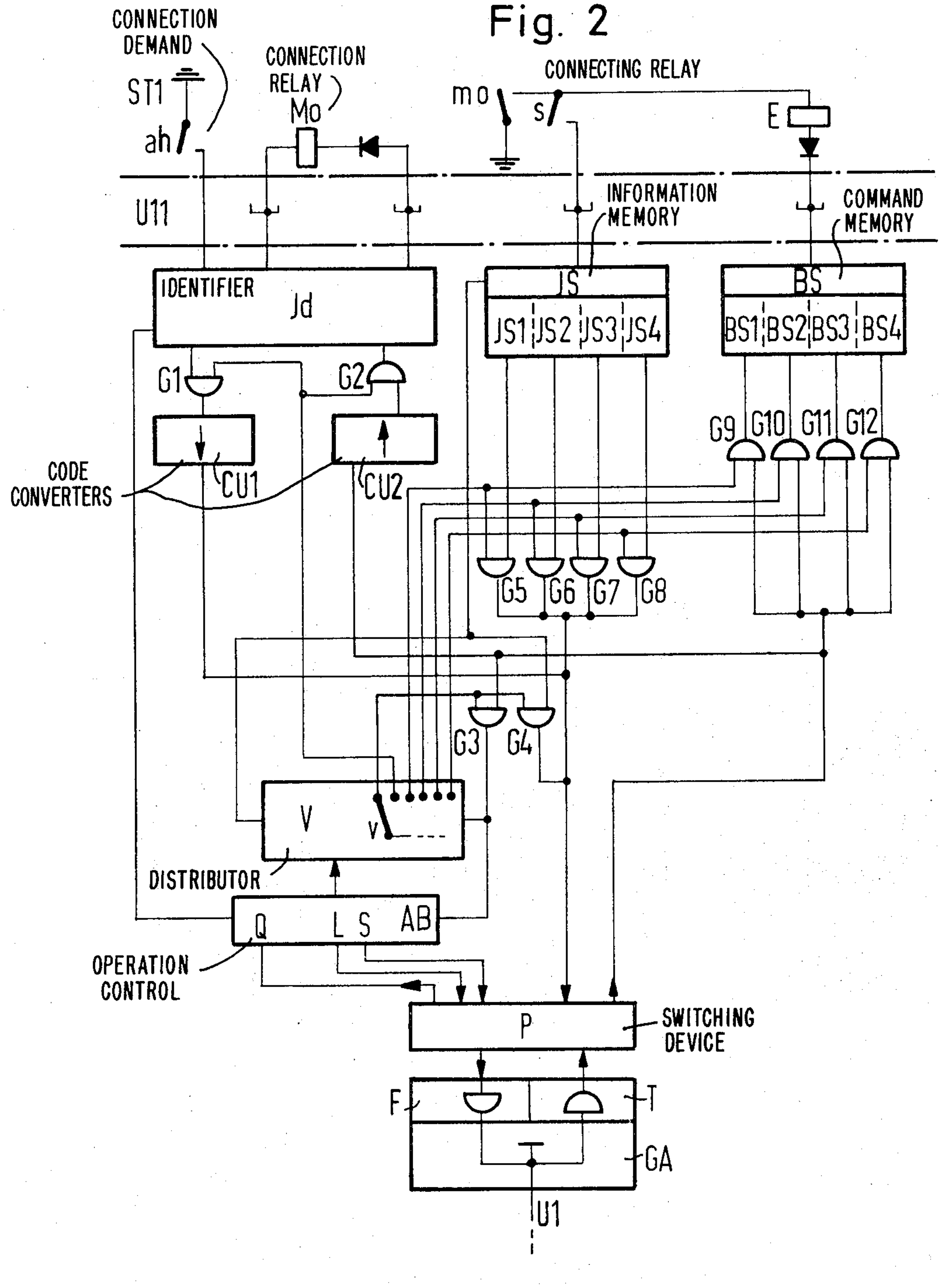
FIGS. 2 and 3 illustrate parts of this exchange installation in greater detail illustrating a preferred embodiment of the invention.

In FIG. 2, further details of an operating area control unit as shown in FIG. 1 are represented. The operating area control unit is in connection on the one side over its current circuits, for example, U11, common to its associated individual apparatus with the individual apparatus, for example, the setting or engagement device ST1 of the coupling group KG1, and on the other side over an individual line U1 with the collection memory SS1 shown in FIG. 1*b*, associated with the central control unit ZS1.

The operating area control unit shown in FIG. 2 can be demanded by the individual members, for example, by the setting device ST1. With the help of an identifer

*Jd*, the operating area control unit is in a position to select from among a plurality of simultaneously present connection stimuli, which are switched in over demand contacts, for example, ah, and to give off a corresponding switching command to the connecting relay, for example, M*o*, corresponding to the pertinent connection stimulus. The demand current circuits run from each individual apparatus singly to the operating area control unit. The connecting relays, for example, M*o*, of the individual apparatus lie in a controlling matrix extending over all individual apparatus.

With the help of contacts *mo* of the appropriate connecting relay, Mo, contacts *s*, as well as windings E, are switched into operation by relays of the setting eevice ST1. The common current circuits U11 connected with the contacts *s* and the windings E are multiple arteries. Likewise, relay contacts *s* and relay windings E of the setting device ST1 are (in contrast to the simplified representation in the drawings) each to be provided in multiples. For a transfer of information to and from the operating area control unit, its switching elements and those of the associated individual apparatus are, with the avoidance of line influences, capable of direct signal exchange. The information to be transmitted in any given case, over the mentioned common current line, for example, U11, may be in the form of a plurality of simultaneous signals. In the present case, the represented switching means are electromagnetic relays or contacts thereof. It may, however, be advantageous to utilize other switching means, for example, any of the known switching means, which would be suitable for this purpose.

As has previously been described, the current circuits common to each operating area and to the associated individual apparatus facilitate the mutual transfer of information through direct exchange of signals.

Figure 3:
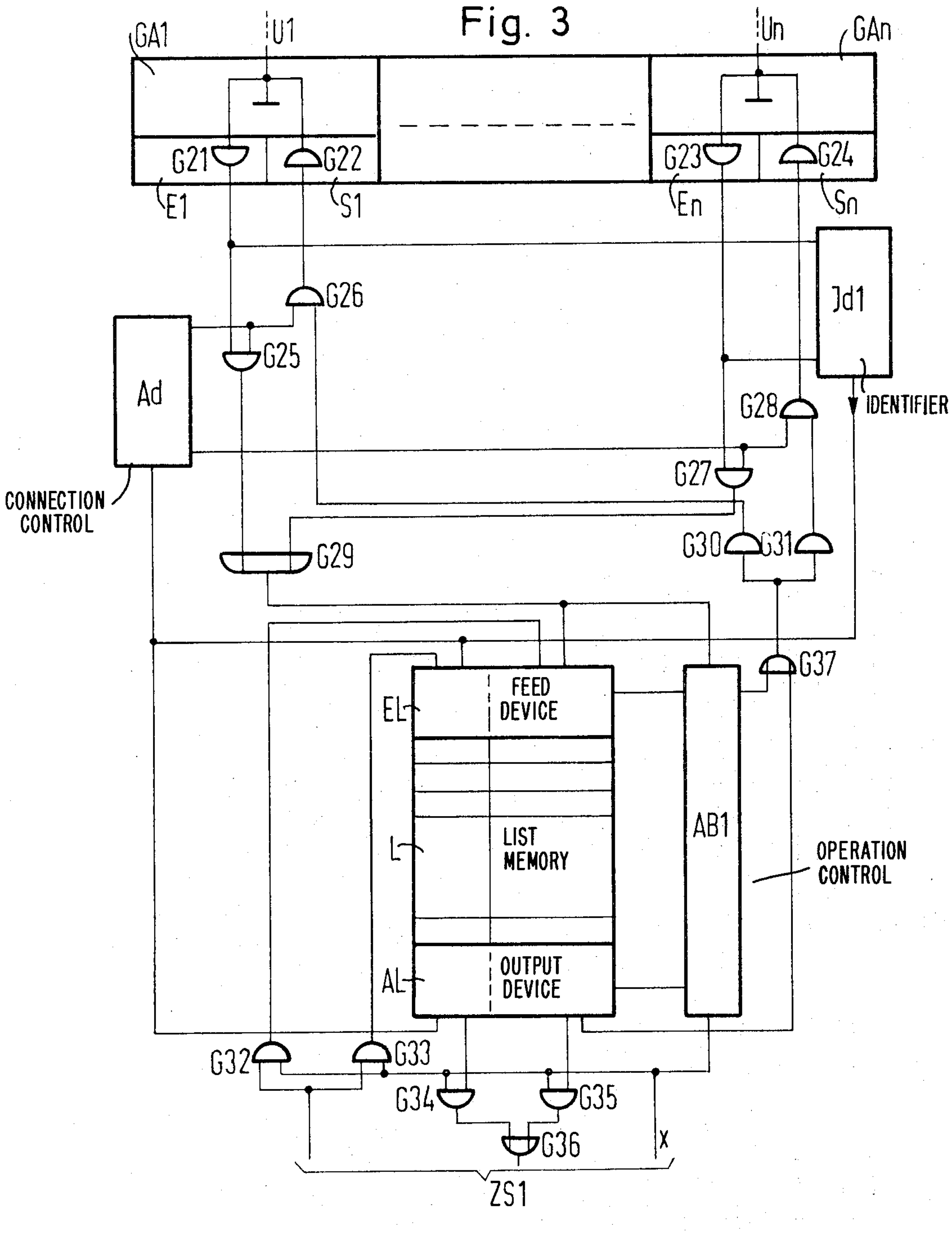
Figure 4:
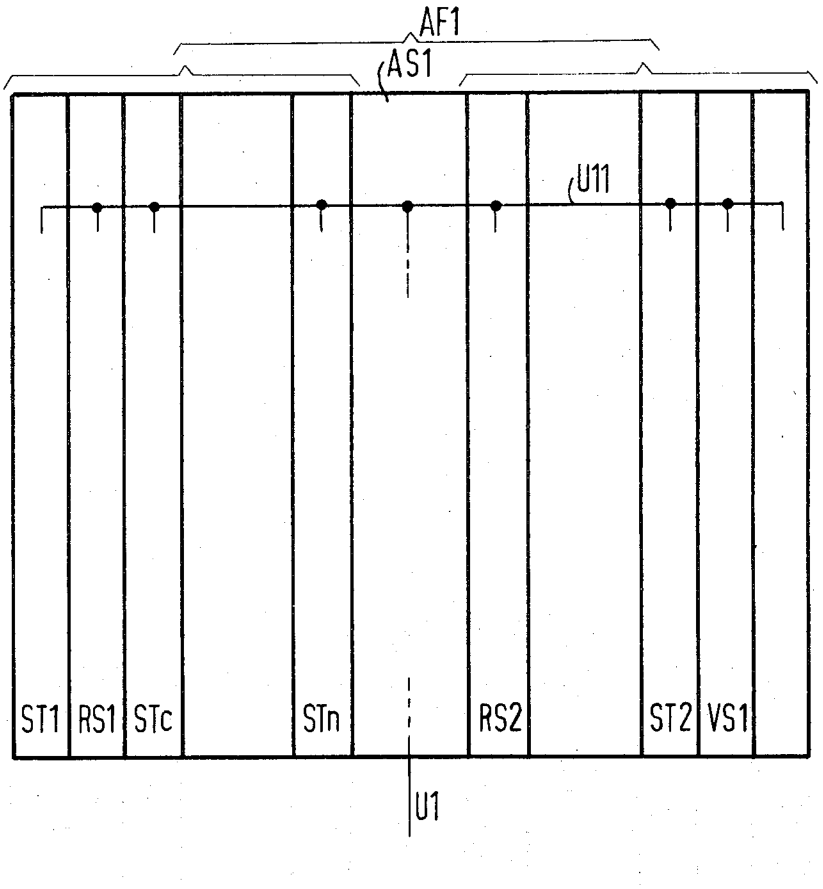
FIG. 4 shows an exemplary structural arrangement of the individual apparatus of a group.

For the transmission of information between the collection memory SS1 and the operating area control devices lines U1 through U*n* are used. Each line is individually connected to a single operating area control and to the collection memory. These are hereafter designated as individual lines. Each of these lines, for example, U1, is equipped at each end with a sending circuit and a receiving circuit of known construction for example, T/F/GA/ and E1//S1/GA1. These may be selected with regard to the technical transmission characteristics of the individual line. Each of these lines is — as FIGS. 3 and 4 show — constituted by two wires. A four wire terminating set serves as sending and receiving circuit, for example, GA, GA1, with a sending portion, for example, F, S1, and a receiving portion, for example, T, E1. Each four wire terminating set is equipped with an appropriate balancing network in the known manner for the accommodation of the technical characteristics of the transmission line.

At that point, it should especially be pointed out that the common current circuits U11 connected with the contacts s and the windings E are of the multiple wire type. Likewise, relay contacts s and relay windings E of the engagement device ST1 are each provided in plural in contrast to the simplified presentation herein. For a transfer of information to and from the operating area control unit, its circuit elements and those of the associated individual apparatus — as previously indicated — directly exchange signals eliminating line influences. The individual apparatus of a group are correspondingly limited in number and — as FIG. 4 shows — are of integral construction in an appropriate manner with their respective operating area control unit.

FIG. 4 is a diagrammatic representation of the actual physical construction showing the arrangement of the various sub-structure there identified. By arranging in layers the flat assemblies forming the individual apparatus on both sides of the operating area control unit, likewise, formed as a flat assembly, there results a spatial arrangement yielding an optimum current circuit routing. The information to be transferred, in any given case, over the said common current circuits, for example, U11, is applied to their multiple wires in the form of several simultaneous signals. Because these common current circuits, for example, U11, do not extend over broad distances, and because, for this reason, no line influences affect the direct exchange of signals between the circuit elements of the operating area control unit and those of the associated individual apparatus circuitry expenditures are minimized. Further, because relatively inexpensive switching means can be used to exchange signals, (i.e., they completely satisfy the speed requirements for the transfer of information with the utilization of parallel transfer of signals over these current circuits) the larger number of arteries, which serve to form these common current circuits represent, nevertheless, no large technical or circuitry expenditures. The illustrated switching means in the present case are electromagnetic relays or contacts thereof. It may, however, among other things, be more advantageous to utilize other known, for example, electronic, switching means for this purpose.

The routing of lines between the collection memory SS1 and the operating area control units, for example, AS1, is different from that between the operating area control units and the individual apparatus. As has previously been described, current circuits common to each operating area and the associated individual apparatus serve the mutual transfer of information through direct exchange of signals. In contrast, lines U1 through *Un* individually associated with the collection memory and the operating area control units facilitate the transmission of information between the collection memory and the operating area control units. The ends of the lines are equipped as described hereinabove.

Some additional operational definitions should be given preparatory to a description of the manner of operation of the operating area control unit. As is already to be taken from the above explanations, information is transmitted from the individual apparatus to the essential control unit, as well as from the central control unit to the individual apparatus. In each case in addition to the collection memory SS1 the operating area control units serve as intermediate members. The transmission of information from one individual apparatus to the collection memory SS1 is hereafter always designated as reading. The opposite transmission of information from the collection memory to an individual apparatus will always be designated as wirting. Accordingly, the reading and writing signals are formed in the operating area control unit. The information to be transmitted to the individual apparatus by the central control unit is hereafter designated only as commands.

The read signal is always formed in the operating area control unit, when based on a demand on the part of an individual apparatus, for example from the setting device ST1 over the demand contact *ah*. This apparatus has been connected with the operating area control unit (relay Mo) and has transferred data to is information memory AS, which is now to be transmitted to the collection memory SS1. Further, the information of the read signals requires that all switching processes of preceding functional operations be completed. If, in contrast, no demand of this type on the part of an individual apparatus is present, then the write signal is formed in the operating area control unit to express the readiness of the operating area control unit to receive information, which in some cases may be present in the collection memory SS1 and is to be transmitted to this operating area control unit.

It is possible that neither a demand by an individual apparatus is present, nor that the operating area control unit is prepared to receive information. This operating condition exists when an operating area control unit is not yet finished with the processing of an information. In this case, the operating area control unit is prepared for no exchange of information with the collection memory. The block signal is formed in the operating area control unit.

Referring to FIG. 2, the described read, write and block signals are formed in an operation control AB of the operating area control unit. The read signal is transmitted over an output L, thereof, and the write signal is transmitted over the output S of the operation control. The block signal requires that the read and write signals are simultaneously transmitted. But, it is also possible to cause the block signal through the absence of the read and write signals, or to provide a special signal circuit for this purpose. Thses signals formed in the operating area control unit, are passed onto a switching device P. If the read signal is present in the operating area control unit, the switching device P gives off a demand signal over the line U1 to the collection memory. If, in contrast, the write signal or the block signal is present in the operating area control unit, then the switching device P emits only other appropriate switching signals over the line U1 to the collection memory, insofar as the collection memory has previously emitted a corresponding demand signal to the operating area control unit.

In FIG. 3, the identifer Jd1 in the collection memory is pointed out, which facilitates reception of the demand signals given off by the operating area control units and selects, in any given case, one single demanding operating area control unit. After each identification operation, Jd gives off the address of the affected operating area control unit in coded form. Further, the connection control Ad in the collection memory is mentioned, which based on a coded address transmitted to it (to the connection control A*d*) of a working field control unit, gives off an appropriate connection signal to the coincidence gates, for example G25 and G26, which corresponds to the given affected operating area control unit and serve for its (the control units) connection. — The working field control unit according to FIG. 2 and the collection memory according to FIG. 3 and the collection memory according to FIG. 4 are described together hereafter.

If, in an operating area control unit, the read signal is present, then — as has previously been described — a corresponding demand signal is transmitted over the associated individual line U1 to the collection memory. Here it arrives at identifier *Jd*1, which carries out an identification operation, and gives off the address corresponding to the operating area control unit in coded form. This address is offered to a listen memory L over feed device EL, as well as transmitted to the connection control A*d*, which for its part with the help of the appropriate gate switches, for example G25 and G26 brings about the connection of the individual line U1 corresponding to the affected operating area control unit. Thereafter, the operation control AB1 of the collection memory gives a callback characterizing signal to the connected operating area control unit over the gates G37, G30 and G36. The recall signal is transformed in the switching device P (FIG. 2) and is transmitted as a receipt signal to the input Q of the operation control AB of the operating area control unit.

The information is transmitted from the operating area control unit to the selection memory in a plurality of successive segments. Each information part is separately introduced and confirmed through special signals. This and the segmental transmission of information are more closely explained hereafter.

Each information is sub-divided to a pluraltiy of information parts. All information is binary coded. Over the current circuits, for example, U11, which are common to the individual apparatus of an operating area and which can connect the individual apparatus with their operating area control unit, all switching signals of a piece of information to be transmitted to the central control unit are simultaneously passed on from the given individual apparatus to the operating area control unit. Depending on the extend of this information, if the information is sub-divided in the operating area control unit in a maximum of four information parts. In the information memory JS for each of the four information parts a part of this memory JS is provided: JS1, JS2, JS3, and JS4. Likewise in the command memory BS for each of four information parts a part of the memory BS is provided: BS1, BS2, BS3 and BS4. The different designation of information memory JS and command memory BS signifies that for the central control unit in one case it pertains to readable information and in the other case it pertains to writable commands. These concepts have previously been defined.

Each piece of information consisting of a plurality of information parts and each command consisting of a plurality of command parts is supplemented for transmission over the transmission line U1 by a length indication and an address, which designates the given individual apparatus. The length indication is obtained in the following manner: The part memories JS1 through JS4 forming the information memory JS each served to take up an information part. The extent of an information is determined by the number of the information parts. This number is the length indication. It is determined in the common part of the information memory JS. This is easily possible, in that the number of the part memories used in the storage of a piece of information is determined in a known manner. The length indication is transmitted as a coded signal by the common part of the information memory JS among other things to the distributor V and there stored.

Before an information transmission or command transmission over the common current circuits U11, firstly the length indication is transmitted. It expresses what quantitative measure the information or the command thereafter transmitted has. If the total contents is expressed instead of in four information parts or command parts, in fewer parts, then the information or command transmission is restricted correspondingly to fewer information parts or command parts. Through the previous length indication the given receiver, that is the given operating area control unit or the collection memory, knows when the given information transmission or command transmission will be completed.

Because, through the initial transmission of the length indication, the quantitative measure of the information to be transmitted is stored in an operating area control unit as well as in the central control unit, it is possible in a simple manner to monitor the orderly execution of the transmission of information.

After the collection memory has received the information besides the length indication and address of the affected individual apparatus and has stored its together with the address of the affected operating area control unit in a line of the listen memory L, (FIG. 3) it disconnects itself once again from the individual line Q11 and thus from the operating area control unit AS1. The collection memory now stands ready to receive further information. It connects itself singly in the previously described manner successively to the different operating area control units and receives successfully, one after the other information with length indication and address of the given individual apparatus from different individual apparatus over the different operating area control units and stores it individually successively in the line of the list memory together with the given address of the affected operating area control unit.

Either when the list memory L of the collection memory is full or in a given case at certain fixed time intervals, the central control unit ZS1 connects itself to the collection memory SS1. The central control unit gives an appropriate demand and connection signal over the line *x* (FIG. 3) to the collection memory. This signal reaches to the gate circuits G34 and G35 as well as to the operations control AB1. In a manner not represented in detail, the collection memory SS1 transmits with the help of its operations control AB1 and of its output device AL the entire contents of its list memory to the central control unit in one stroke, i.e., in any given case, in association with each other the address of the pertinent operating area control unit, the length indication, the address of the given individual apparatus and the information. In this manner the contents of the list memory L is read line by line successively one after another to the central control unit.

Through this principal of information collection and transmission, the exchange of information is substantially accelerated for the central control unit and thereby its performance capacity is meaningfully increased, in that the information is taken up by the central control unit commonly in multiples.

In the same manner, commands are transmitted by the central control unit in common with the addresses of the operating area control units and collected in common in multiplies at the collection memory. For this purpose, the central control unit transmits over the line *x* to the collection memory appropriate switch-on and preparation signals which reach the gate-circuits G32 and G33, as well as the operation control AB1. After a corresponding receipt signal form the operation control AB1 of the collection memory, to the central control unit, the latter transmits, together with addresses of operating area control units and multiple series of commands to the collection memory, addresses to the affected commands, line by line, over the feed device EL of the list memory L. After completion of this operation, the collection memory undertakes the transmission of the information to the different operating area control units. According to the operating area control units, addresses contained with the commands, the collection memory undertakes successive one after the other corresponding connections to the different operating area control units and transmits from the given line of the list memory, the given command to the affected operating area control unit. Such an operation is hereafter explained in further detail.

Commands are transmitted from the collection memory to the operating area control unit in a similar manner to information. An operating area control unit is ready to receive a command from the collection memory when no demand on the part of an individual apparatus is present, and the operating area control unit is at rest. The operation control AB (FIG. 2) determines from the distributor V whether directly preceding functional operations possibly are ended and whether a new demand on the part of an individual apparatus is present. When this is not the case, the operation control forms the write signal which it transmits to the switching device P.

The switching device P in FIG. 2 recognizes from the write signal that the pertinent operating area control unit is ready to receive a command. As soon as the collection memory has undertaken a connection over the affected gate circuits, for example, G25 and G26, to the affected operating area control unit for the preparation for transmission of a command, from a certain line of its list memory corresponding to the working field control unit — address stored in this line, which the collection memory transmits to the connection control Ad over the output device AL with the help of its operation control AB1, the collection memory transmits from its operation control AB1 a preparation signal to the operating area control unit. This preparation signal is received by the switching device P as a receipt signal for the write signal over the input Q in the operation control AB. The switching device P transmits further call back signals into the collection memory, which shows the collection memory that it should now begin with the transmission of the command.

The operation control AB causes the gate G3 to be switched open in a not shown manner over the distribution V for the first byte to be expected from the collection memory. This first byte contains the length indication, which is received and stored by the distribution V. It knows thereby, after how many switching moves of its switching arm *v*, the transmission of the command will be ended.

In a similar manner as in the transmission of information from an operating area control unit to the collection memory, the bytes containing the command to be transmitted are successively received in the reversed direction over the gates G9 through G12 and received and stored in the memory sections BS1, BS2, BS3 and BS4 of the command memory BS. The two bytes containing the address of the given individual apparatus preceding the command have been taken up in the identifier *Jd* over the code converter CU2 and the gate G2. These two bytes are converted by the code converter CU2. The identifier *Jd* forms, herefrom, a connecting command, through which the affected connection relay, for example, MO, of that individual apparatus, for example, SP1, which is designated by the address, is activated.

After complete transmission of the command from the collection memory to the operating area control units, the former disconnects itself again from the latter. The collection memory turns now to the next command in the next line of its list memory, and transmits it according to the stored operating area control unit address in the same manner to the pertinent operating area control unit. In this manner, the collection memory distributes the different commands over the pertinent operating area control units to the individual apparatus determined by the corresponding addresses. The commands stored in the command memory BS are transmitted over the common current circuit U11 to the relay E of the individual apparatus ST1, after the connection of the pertinent individual apparatus to the operating area control unit.

In a modification of the described example, it is also possible to provide two different list memories in the collection memory according to FIG. 3, of which one serves for the transmission of information from the operating area control units to the central control unit and the other serves for the transmission of commands from central control unit to the operating area control units. Thereby, it is made possible that the central control units can dispose of commands to the collection memory, although its list memory, which serves the transmission of information from the operating area control units to the central control unit, is full. Thereby, the danger of a blocking of the central control unit resulting from an over-saturation of information is prevented.

In addition to the previously described devices, data apparatus D1, D1′, Dz1 and Dz2 are also represented in FIG. 1*b*. The data apparatus D1 is connected over two individual lines U*d* with the two collection memories SS1 and SS2. Because this doubling — as previously indicated — serves to raise the operation reliability and serves the possibility of a running control of functions, which is not essential for the understanding of the invention, this will not be discussed further. The data apparatus D1 is connected over a data line d1 with a second data apparatus D1′ to a data channel. With the help of such data channels, it is possible, to provide operating areas including operating area control units at spatially remote locations, and to operate them under central control from a central control unit of the same telephone exchange installation. In this manner, as is shown, a telephone exchange installation can be constructed on the one hand with optimal utilization of the great performance capacity of an electronically functioning central control unit for a relatively large number of subscribers, and can be spatially so distributed, that through the arrangement of operating areas viewed as remote sub-offices, along with operating area control units, a relatively small average subscriber line length will be achieved.

The fact of remote control of an operating area by its operating area control unit utilizing a data channel opens the further possibility of operating the connection lines (for example, local connection lines) running between the different operating areas, remotely located from each other without line closing circuits at both ends of a connection line. That is, the connection lines can be directly connected to the switching matrix terminals. The dial signals are transmitted over the central data channels in the manner known from British Pat. No. 843,175 and 1,085,898 and German Pat. No. 1,097,491. In this case, the data channel also serves not only for the remote control of the sub-office from the central control unit, but also for the omission of the line closing circuits. FIGS. 1*a* and 1*b* show such connection lines, and they are designated VL1 and VL2. The y lead from switching matrix terminals of the operating area AF1 to switching matrix terminals of the remotely located operating area AFF.

The operating area ASF of the spatially remote operating area AFF is, incidentally, also connected to the collection memory through a data channel just like the other operating area control units AS1 through AS*n*. The cooperation between the operating area control unit ASF of the remote operating area AFF with the collection memory SS1 is, neglecting the switching therebetween of the data channel D1/*d*1/D1′, the same as that described for the operating area control unit AS1.

The two data apparatus D*z*1 and D*z*2 belong to two data lines *dz*1 and *dz*2, which lead to another telephone exchange installation having its own central control unit. The duplication of the data apparatus and the data lines serves the purpose of functional reliability and permits simple functional control. Because this is not meaningful for the understanding of the invention, only one single data channel D*z*1/*dz*1 is generally discussed herein.

The data channel D*z*1/*dz*1 serves only as the medium of transmission of signals from one central control unit of a telephone exchange installation to another unit of another telephone exchange installation. Its task is, thus, a different one from the main task of the previously described data channel D1/*d*1/D1′, which is provided for the remote control of an operating area control unit of a spatially remote operating area. Corresponding to the different function of the data channel D*z*1/*dz*1, its traffic load is also substantially larger than that of the other data channels. Such data channels between central control unit and central control unit are, as a rule, only provided when an especially large connection traffic prevails between the two corresponding telephone exchange installations, for example, between two neighboring densely populated cities. This case also arises when in a large city, a central controlled local office for the entire city having a central control unit serving the total city local traffic and a regional central long distance office likewise, having an individual central control unit are provided, and when this central long distance office, in addition to the regional traffic serves the total outgoing and incoming long distance traffic of the large city. The development of an extensive flow of information under this type of, or similar, condition is facilitated in the example described herein by the data channel D*z*1/*dz*1, which analogously to the arrangement for the collection memory SS1, is connected with its data apparatus D*z*1 to the central control units ZS1. Just like with the collection memory SS1, the central control unit ZS1 is also in connection with far away central control units over data channels. Thus, further data channels like the data channel D*z*1/*dz*1 to different other central control units can exist. For the reception or transmission, in any given case, of a larger series of information the central control unit ZS1 always needs to control only one single connection operation. Because there are only very few different connection operations for the central control unit, for the reason of the small number of collection memories and data channels to other central control units, there can be realized in the previously described manner in a very simple way.

If the central data channel Dz1/dz1 has a transmission speed matched to the input and output speed of the central control unit, then central control units remotely located from each other can directly develop their exchange of information, that is, no intermediate storage is needed. It is, however, also possible to equip the data apparatus Dz1 with a list memory in the manner shown in FIG. 3 for the collection memory, which list memory serves as buffer memory on the data line dz1 taking into consideration a smaller speed of transmission.

Through the described type of information reception and output on the part of a central control unit, conditions suitable for the operation of data traffic to other central control units are, thus, created in that, through the transmission of information collected in multiples, the information density on the data channels serving these purposes is substantially increased compared to those, which are used in the known manner according to U.S. Pat. No. 3,665,110 for telephone exchange installations of this type, for the remote control of an operating area control unit of a spatially remote operating area.

The preferred embodiment of the invention described herein is only exemplary of the principles of the invention and is in no way limiting. The scope of the invention is defined in the appended claims.

We claim:

1. In a centrally-controlled telephone exchange installation having individual apparatus grouped in operating areas, each of said operating areas being connected to a central control unit through individual operating area control means, said operating area control means including buffer memory means and code transformation means, the improvements comprising:

collection memory means interposed between groups of said operating area control means and said central control unit, said collection memory means including means for successively connecting said collection memory means to said operating area control means responsive to command generating means in said collection memory means for transmitting and receiving information and addresses related to said individual apparatus controlled by said connected operating area control means, said collection memory means including list memory means for storing said information and addresses and the address of said operating area control means from which said information and addresses were transmitted, said information and addresses being grouped in said list memory means for transmission in parallel to said central control unit, means connecting said list memory means to said central control unit for transmitting and receiving said information and addresses related to said individual apparatus in parallel to and from said central control unit, said received information and addresses being transmitted to said operating area control means as said collection memory means is successively connected thereto, and data transmission means connected to said central control unit for transmitting information in parallel from said central control unit to a central control unit of another exchange installation, said data transmission means being connected to said central control unit in parallel with said collection memory means.

2. The exchange installation defined in claim 1 including individual data channel means connecting each of said operating area control means to the collection memory means cooperating therewith.

3. The exchange installation defined in claim 1 wherein said data transmission means includes buffer memory means for storing said information being transmitted in parallel from said control unit to said another central control unit.

4. The exchange installation defined in claim 1 wherein said list memory means comprise first and second buffer memories, said first buffer memory receiving and storing information and addresses from said operating area control means for transmission to said central control unit, said second buffer memory receiving and storing information and addresses from said central control unit for transmission to said operating area control means independent of the timing of transmission by said list memory to said central control.

* * * * *